Figure 1:
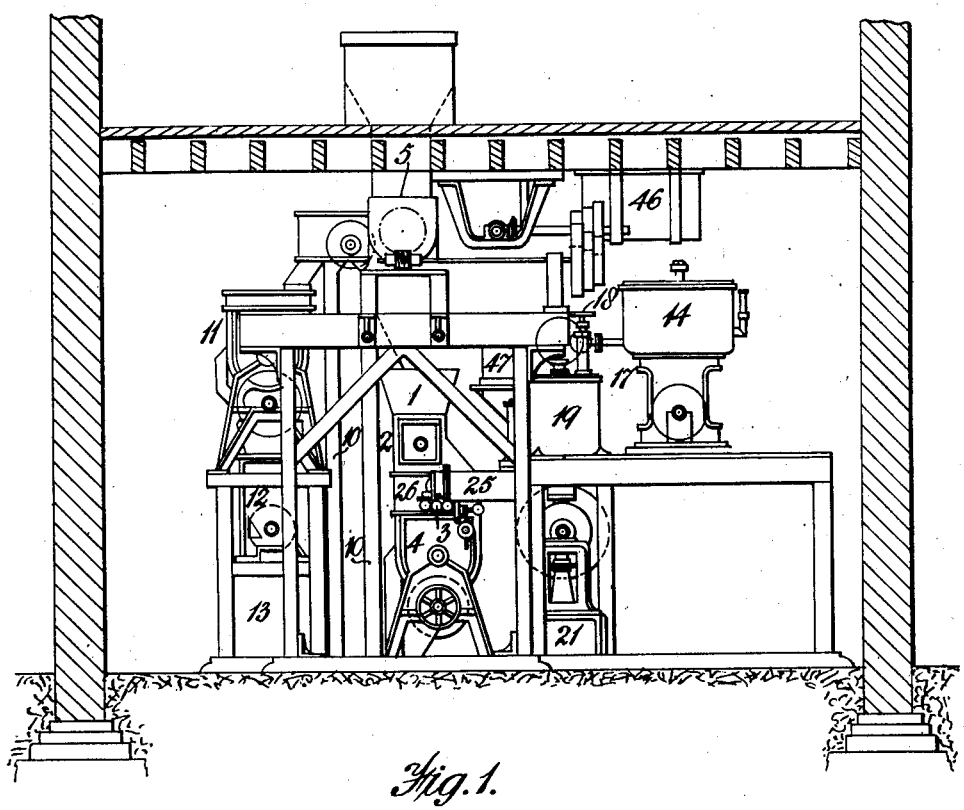
Figure 18:
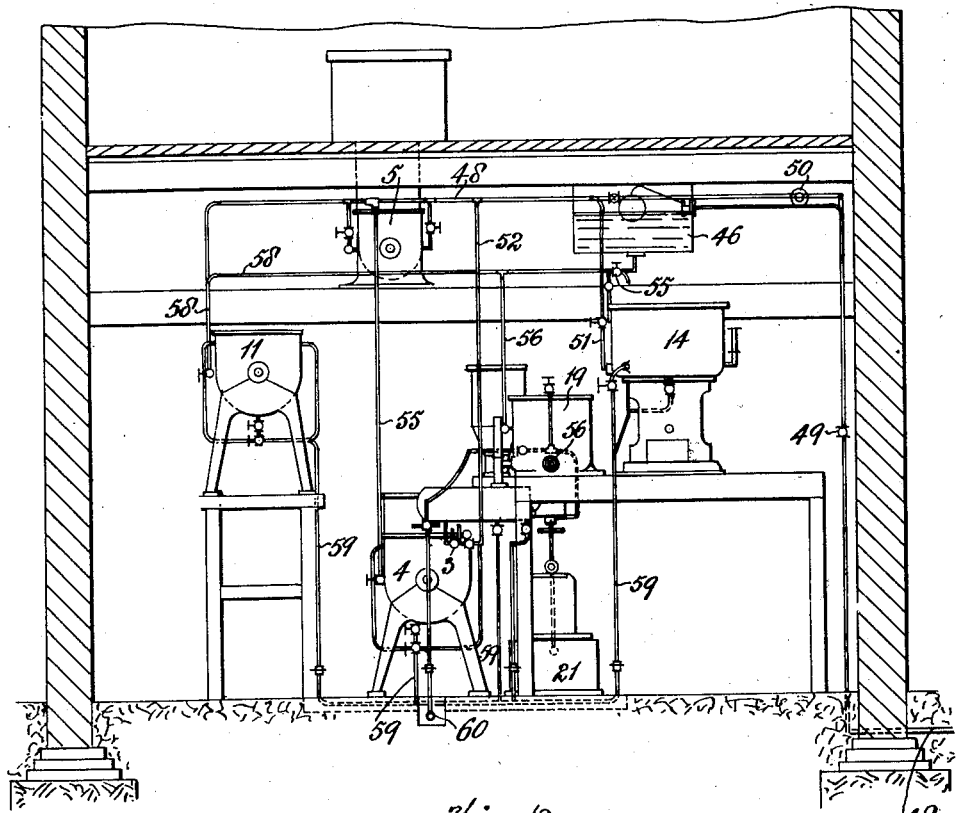

Sept. 1, 1925.  1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921    14 Sheets-Sheet 1

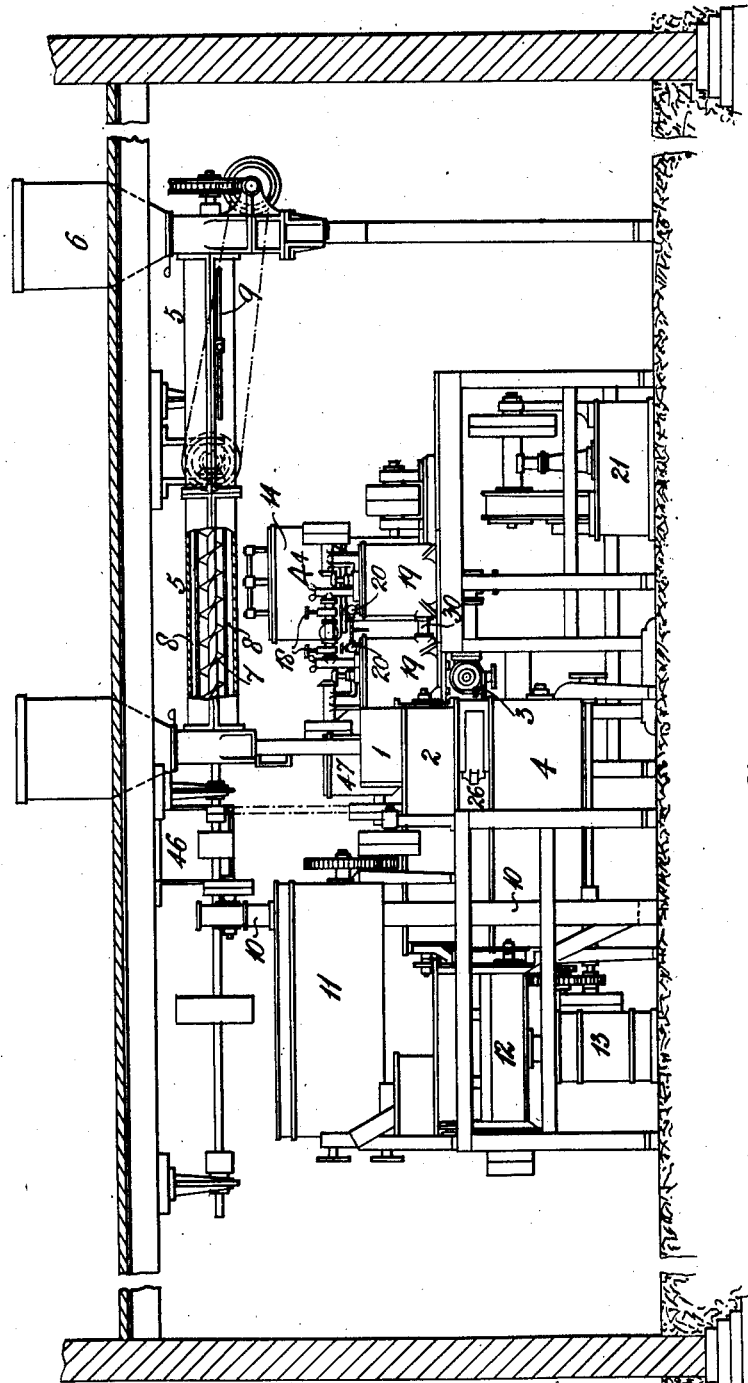

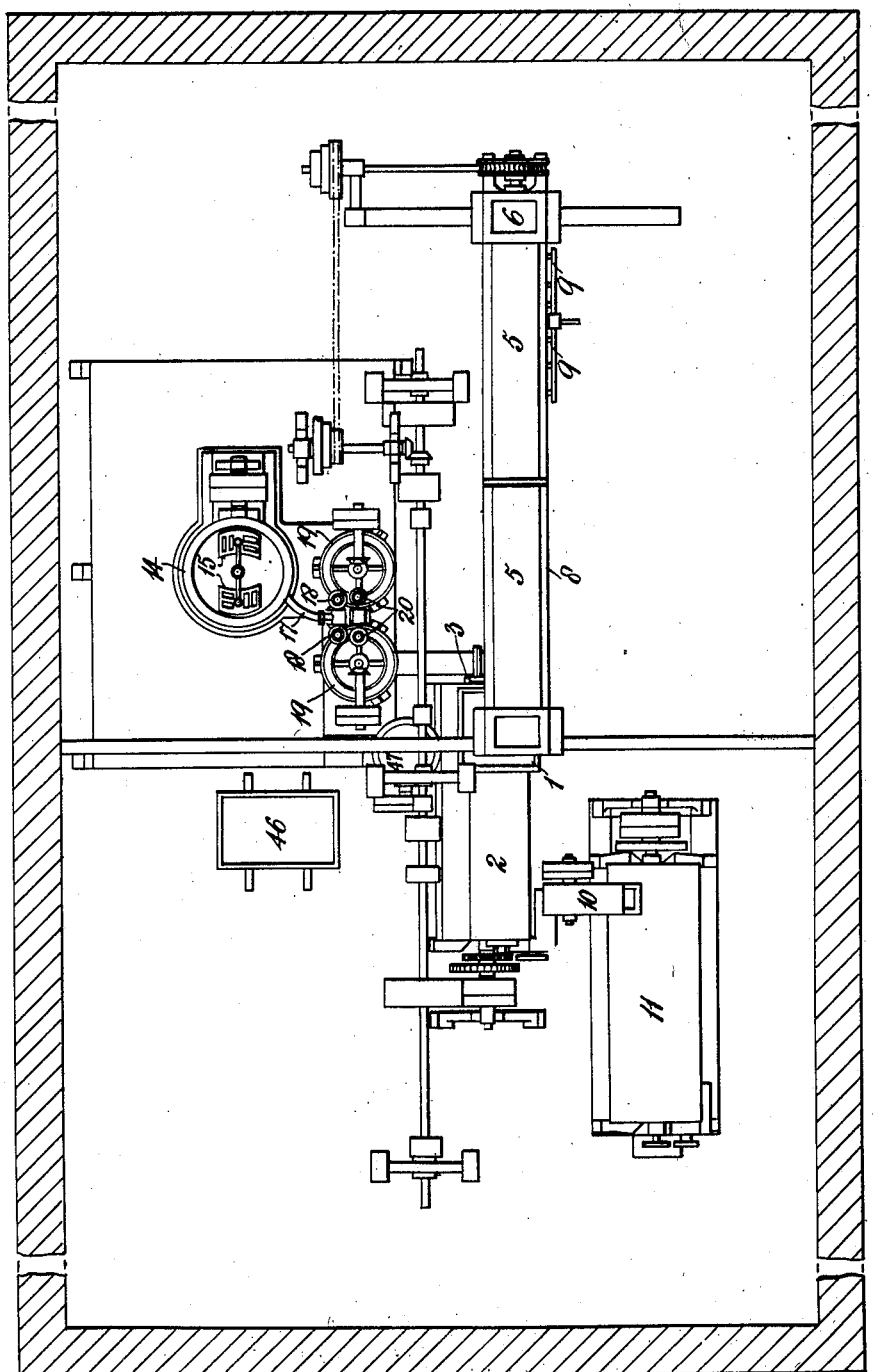

Sept. 1, 1925. 1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921 14 Sheets-Sheet 4
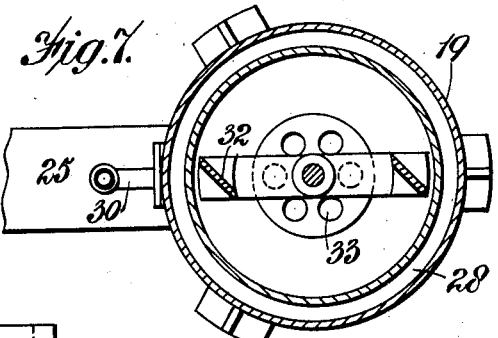
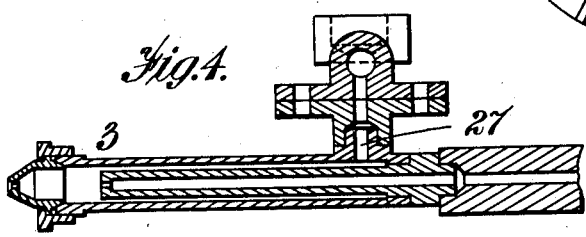
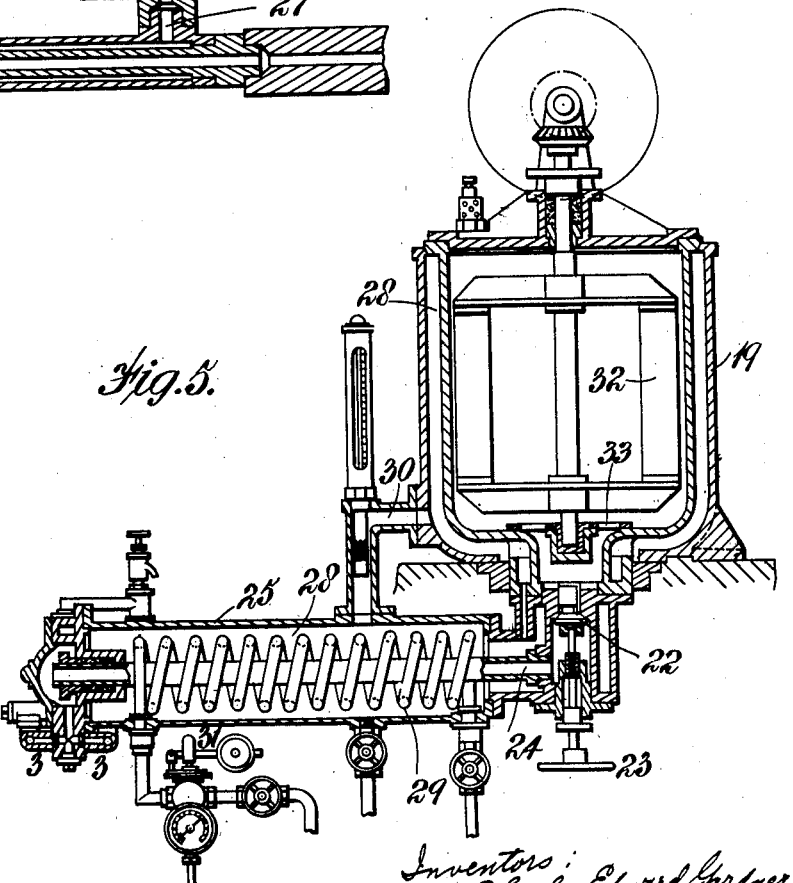

Sept. 1, 1925.                                                 1,552,293
                    C. E. GARDNER ET AL
        APPARATUS FOR THE MIXING OF FOOD MATERIALS WITH
           EDIBLE FATS, CHOCOLATE, AND LIKE MATERIALS
                    Filed Aug. 31, 1921        14 Sheets-Sheet 5
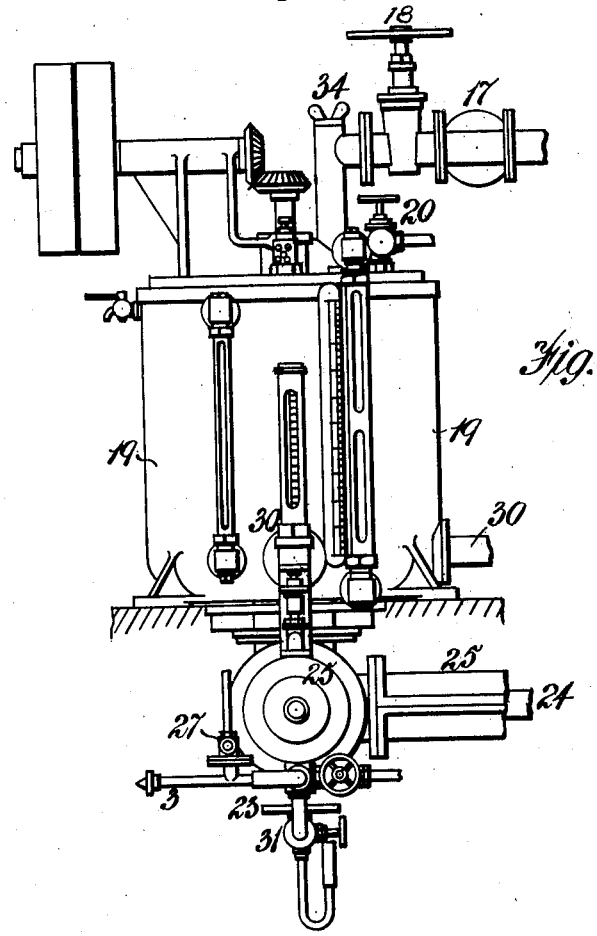
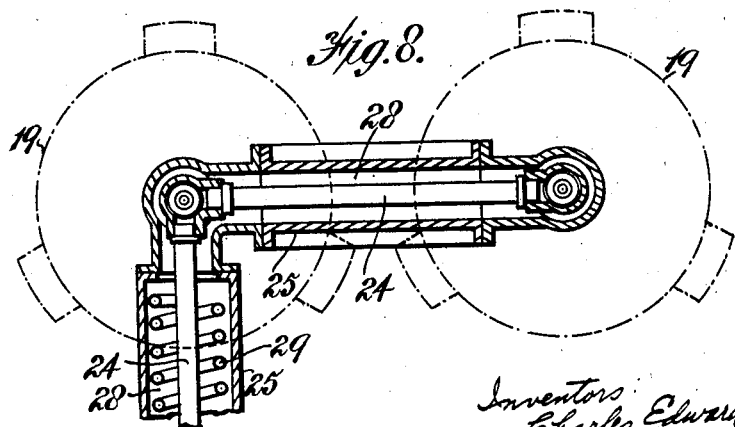

Sept. 1, 1925. 1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921 14 Sheets-Sheet 6
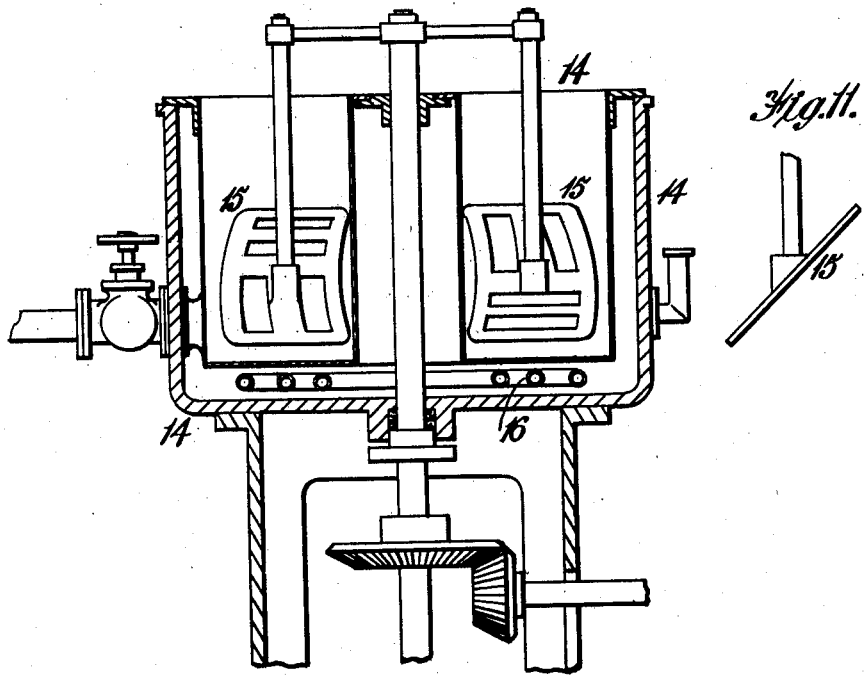
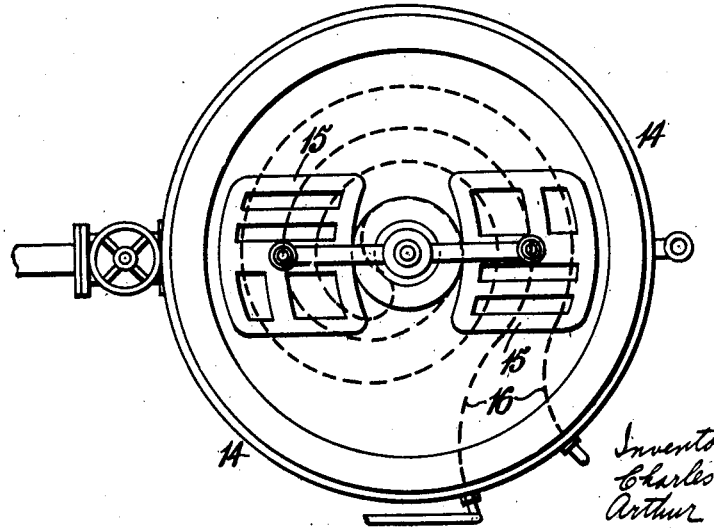

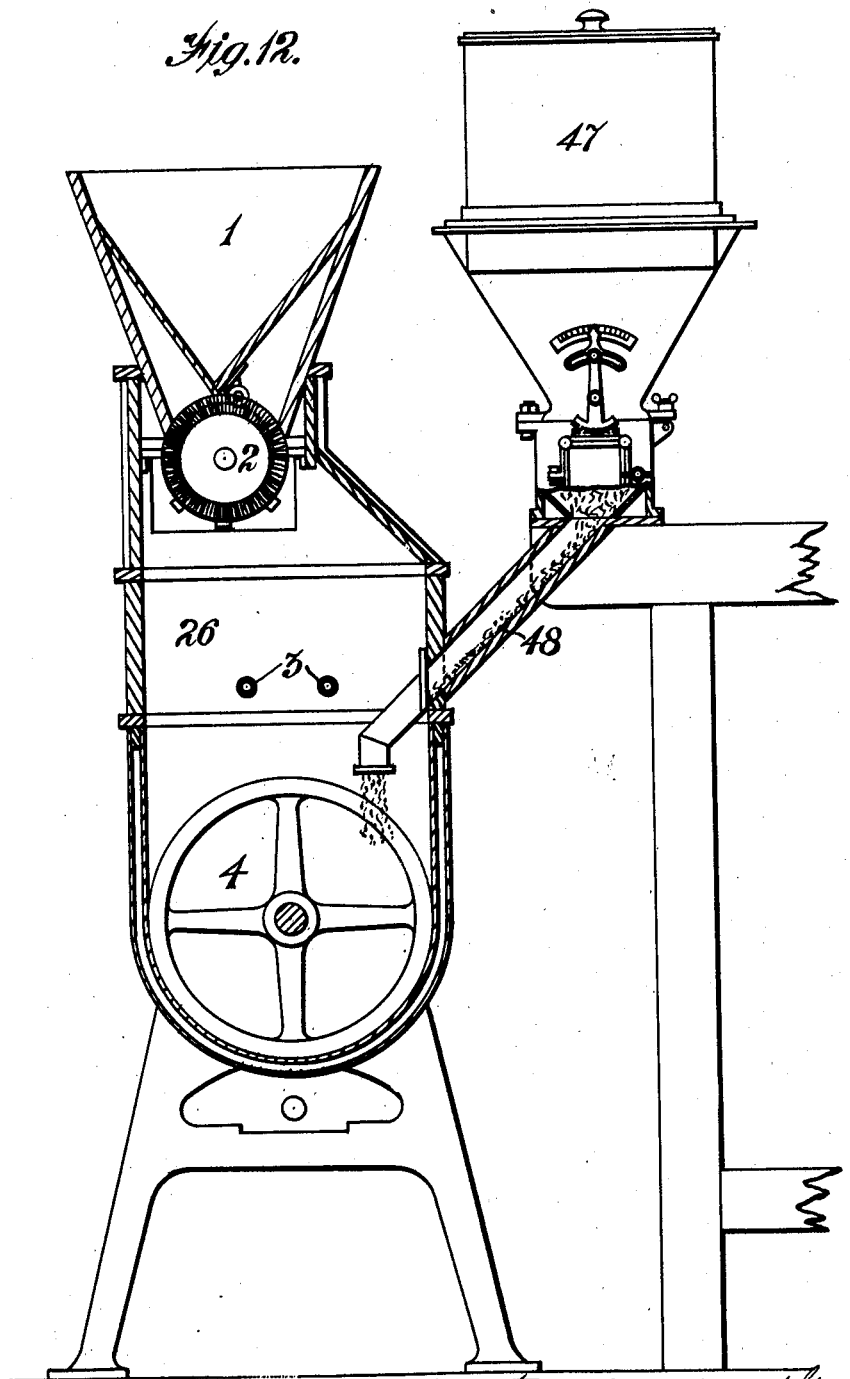

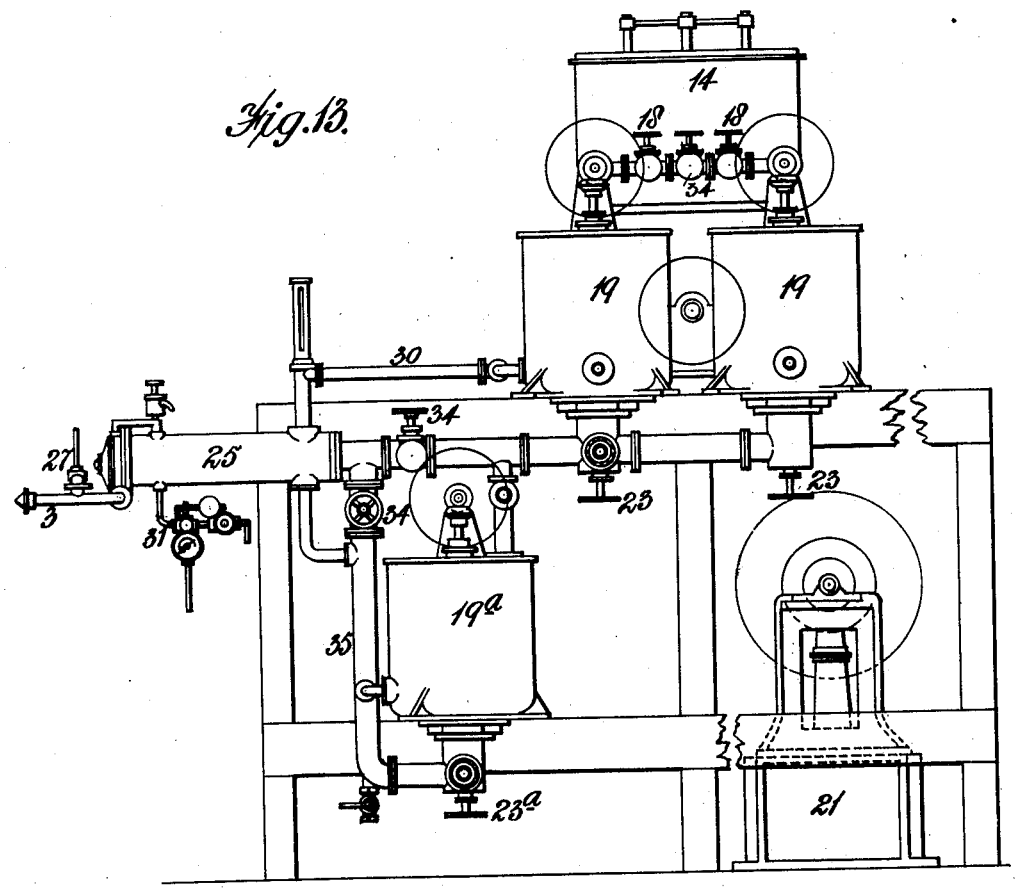

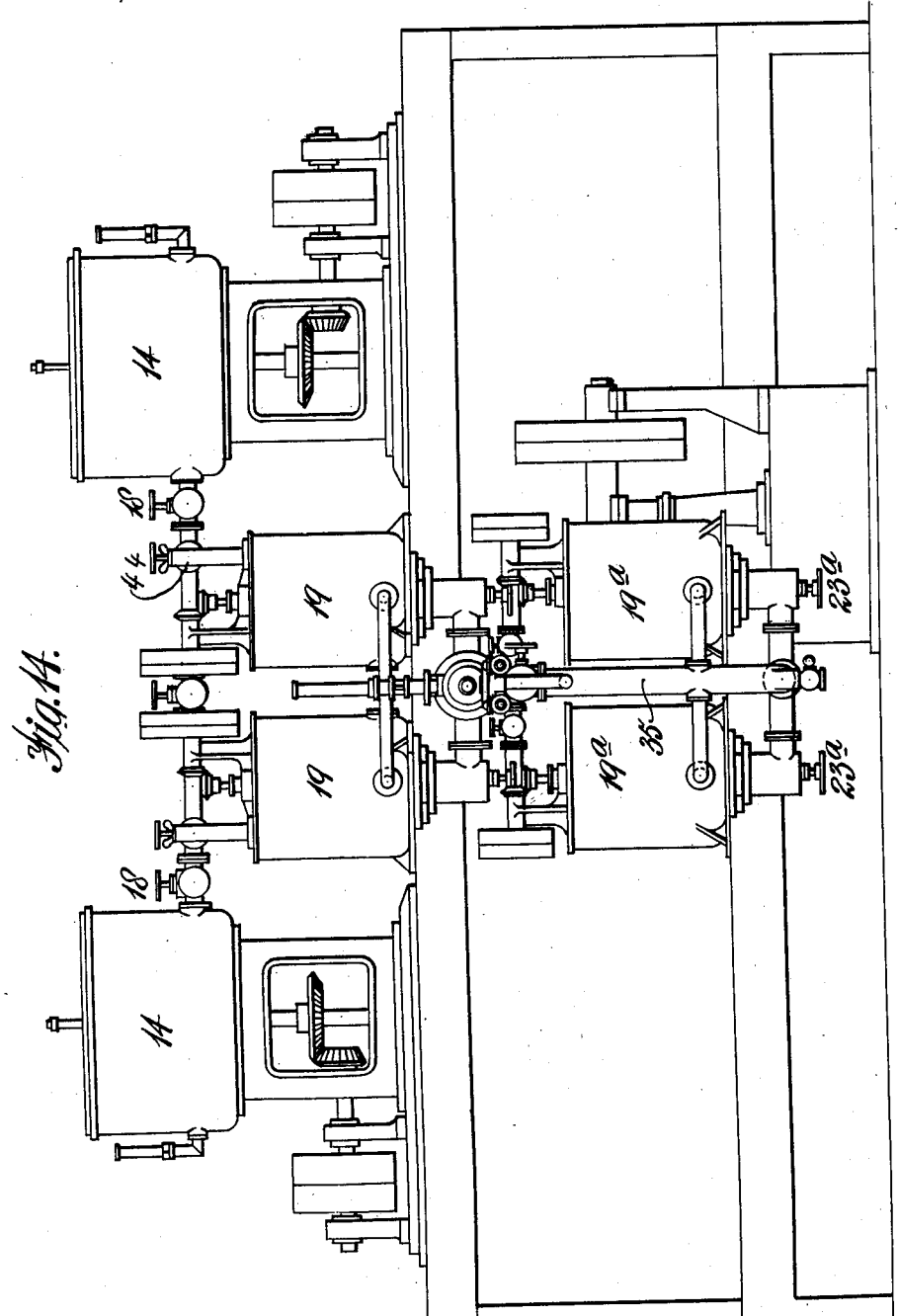

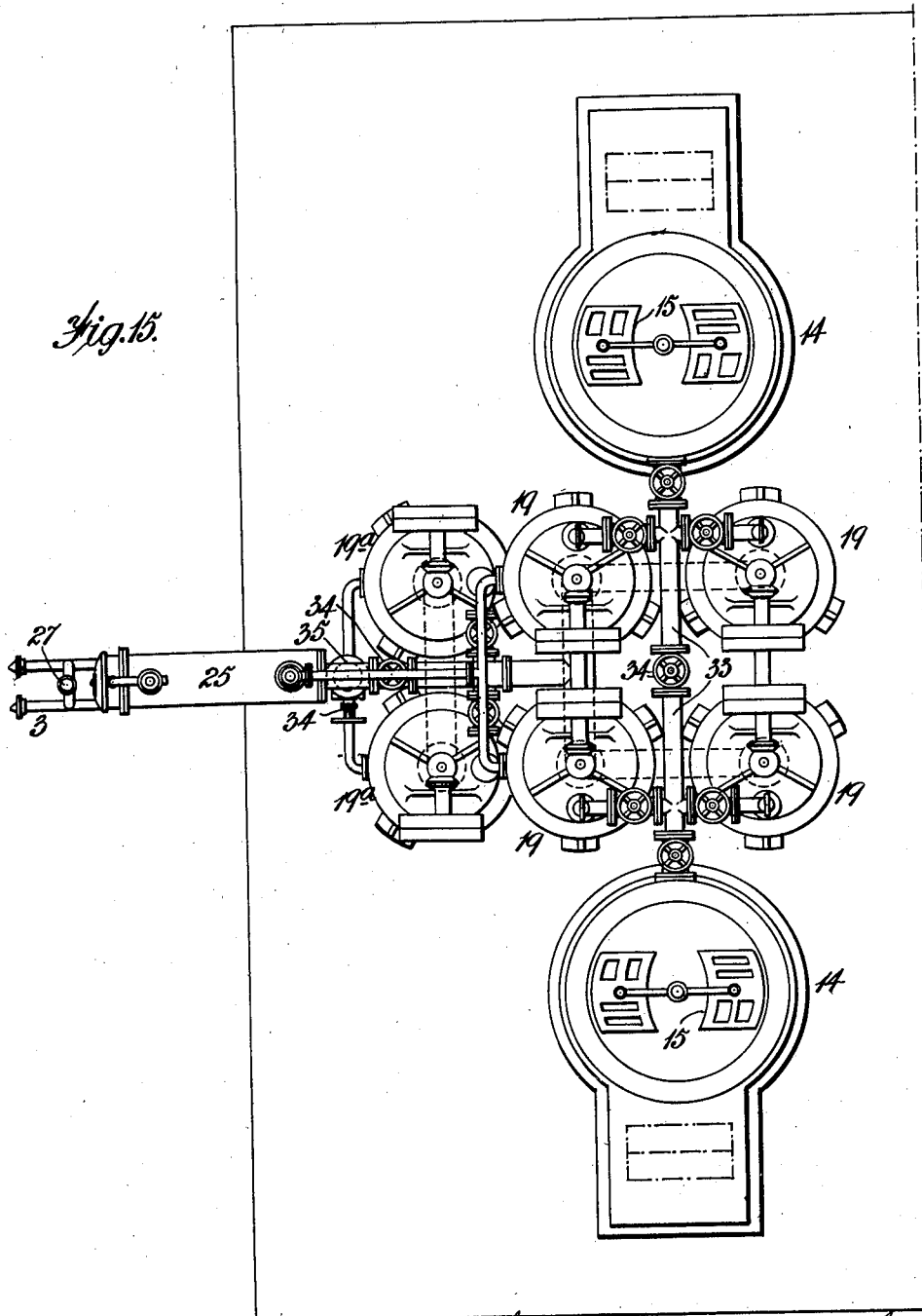

Sept. 1, 1925.  1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921    14 Sheets-Sheet 11
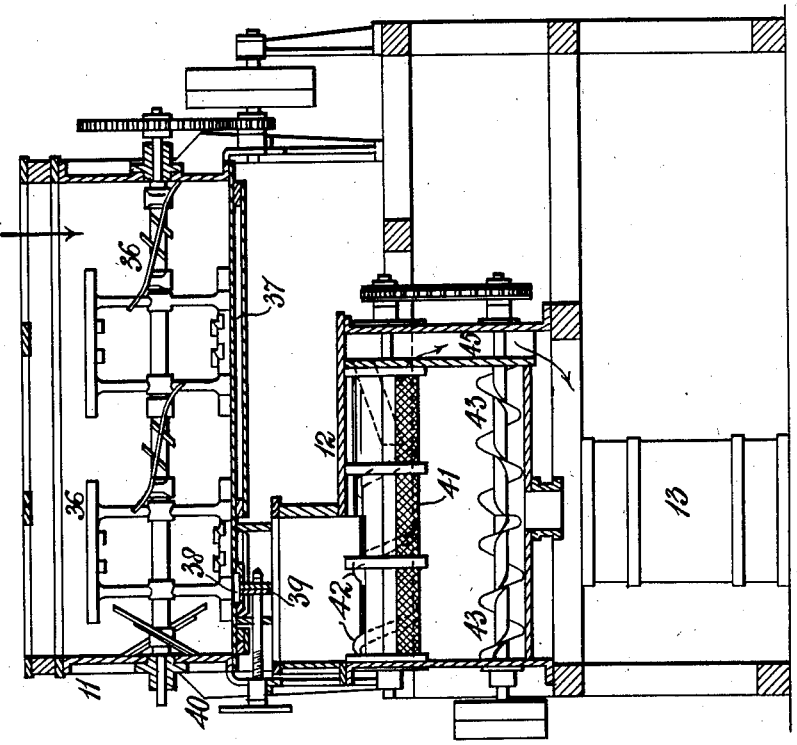
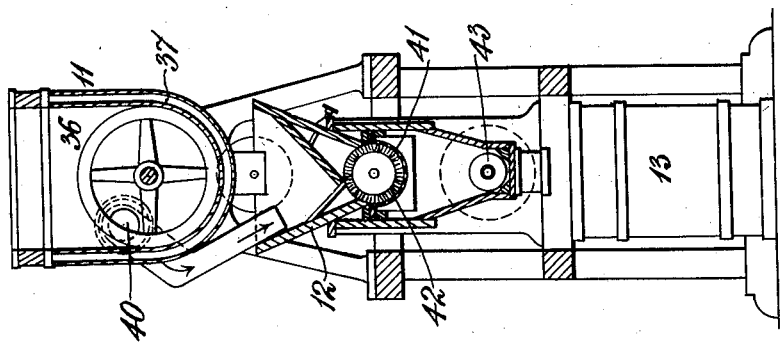

Sept. 1, 1925. 1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921 14 Sheets-Sheet 13
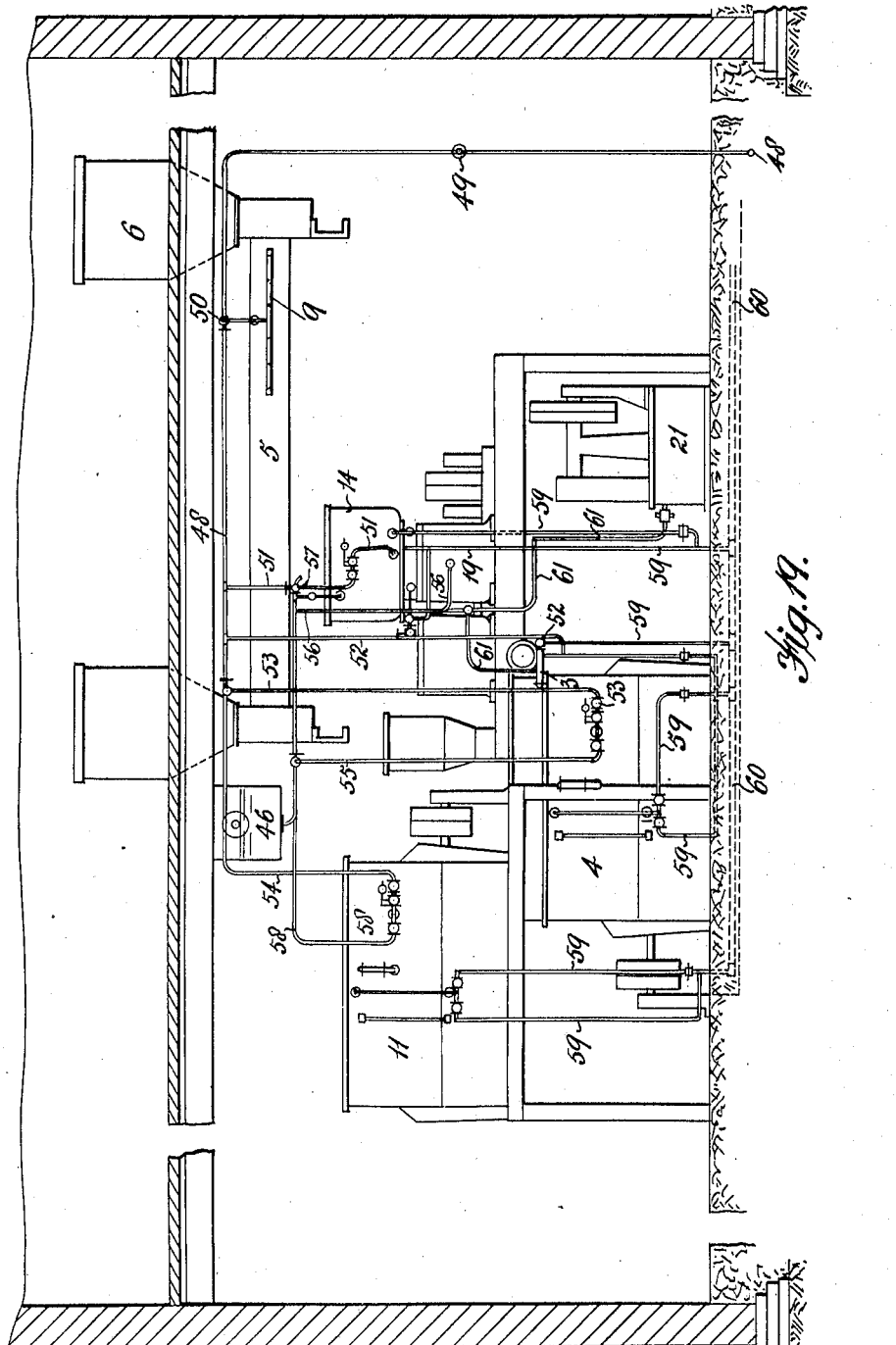

Sept. 1, 1925.
1,552,293
C. E. GARDNER ET AL
APPARATUS FOR THE MIXING OF FOOD MATERIALS WITH
EDIBLE FATS, CHOCOLATE, AND LIKE MATERIALS
Filed Aug. 31, 1921    14 Sheets-Sheet 14
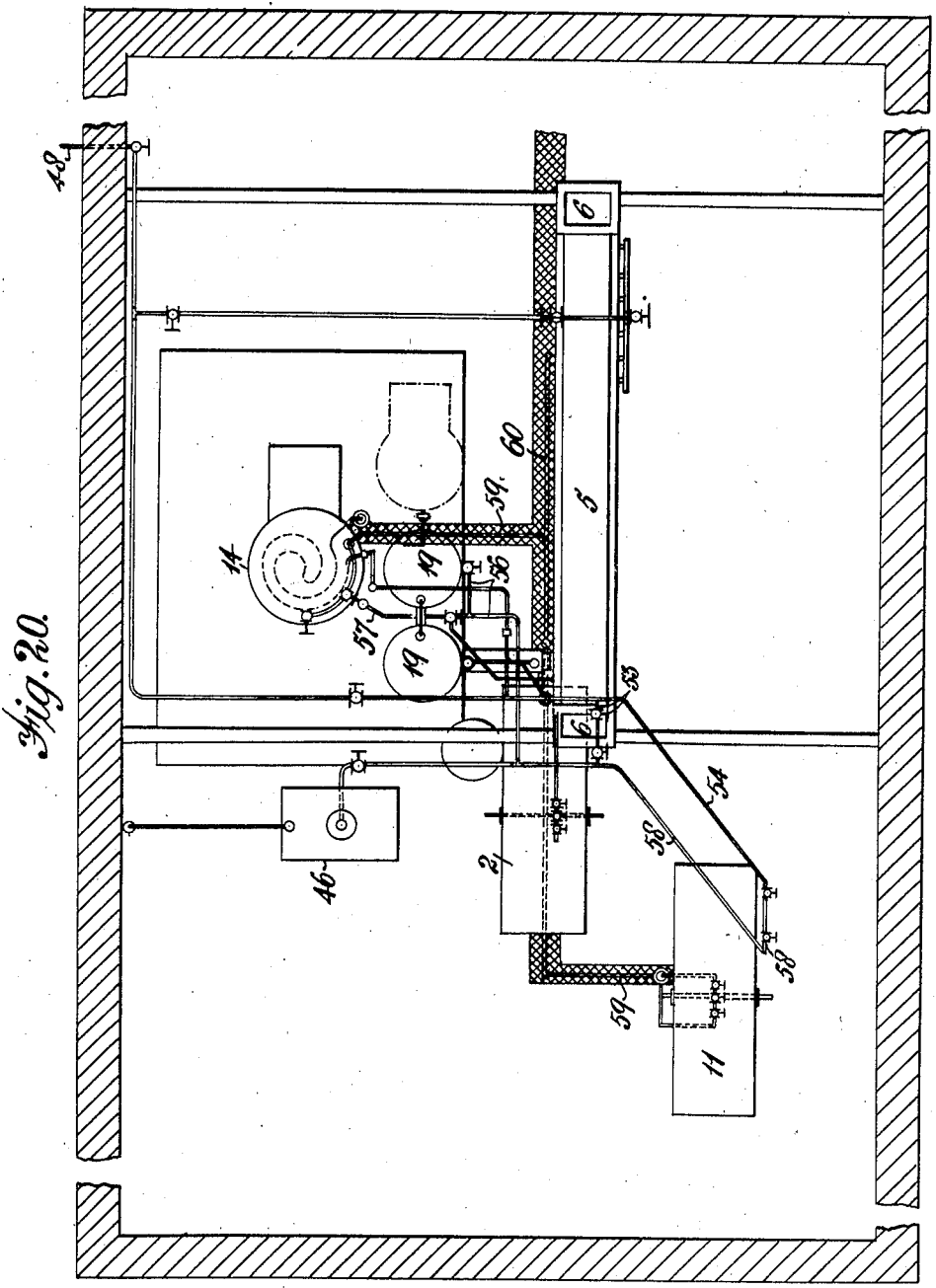

Patented Sept. 1, 1925.

1,552,293

UNITED STATES PATENT OFFICE.

CHARLES EDWARD GARDNER, OF GLOUCESTER, AND ARTHUR ROWLAND GOODWIN, OF KIDDERMINSTER, ENGLAND.

APPARATUS FOR THE MIXING OF FOOD MATERIALS WITH EDIBLE FATS, CHOCOLATE, AND LIKE MATERIALS.

Application filed August 31, 1921. Serial No. 497,217.

*To all whom it may concern:*

Be it known that we, CHARLES EDWARD GARDNER, a British subject, of Bristol Road, Gloucester, England, and ARTHUR ROWLAND GOODWIN, a British subject, of Boscombe, Kidderminster, England, have invented a new Apparatus for the Mixing of Food Materials with Edible Fats, Chocolate, and like Materials, of which the following is a specification.

This invention relates to a complete apparatus or plant for carrying on a continuous operation which enables particles of cereals or other food materials to be sufficiently coated with materials such as edible fats, chemical substances, chocolate and the like, which require to be added in order to keep in a liquid form during their application, and it consists primarily of apparatus for maintaining said materials at the requisite temperature to enable same to be conveyed to and sprayed upon such cereals as same is caused to descend in a divided condition from a sifter in its passage to a mixer arranged below same, and further in the combination of such apparatus with apparatus for preparatory treatment of the cereals to bring same if necessary to the required condition to ensure the adhesion of the sprayed liquid to the cereals, and finally with apparatus for the subsequent drying and sifting or grading thereof, after the spraying and mixing operation has been effected.

For the purpose of maintaining the material to be sprayed on to the cereals at the required temperature a melting pot or pots having agitators is provided and is heated preferably by a steam coil situated in a water jacket below the melting pot and through which a circulation can be maintained, and the steam pressure to the coil being adjusted by a control valve to enable the desired temperature to be attained.

The melting pot or pots is arranged in connection with duplicate containers or receivers, which can be alternately placed in communication therewith for filling, while the other is by an insulated tube connected with a spraying nozzle delivering into a casing between a sifter and mixing apparatus arranged beneath same, and into which the cereals pass from said sifter in a divided condition. The containers are connected together and to the melting pot so as to permit them to be alternately filling and delivering to the spraying nozzle, and a continuous operation thus carried on.

Each of the containers is in connection with a compressed air supply, which when admitted by acting on the contents forces them to the spraying nozzle which is also connected with said air supply so as to produce an ejector action and effect the dispersal or issue of said material in a fine spray from the nose thereof. The containers and also the connection between them and with the spraying nozzle are water jacketed to as near the nose or point of issue as possible, and a steam coil contained in said jacket enables the desired temperature to be maintained throughout to ensure the material to be sprayed being kept in the necessary condition for its conveyance to and issue from the nozzle in the required finely divided spray, and a strainer is preferably arranged at the outlet from the container and a valve provided to control the flow of material to the spraying nozzle. Rotating stirrers are also preferably provided to keep the liquid in constant agitation in the containers and ensure uniformity of consistency of the materials. The containers may also be provided with a closed inlet permitting the supply direct to the containers of material which does not require preparatory treatment in the melting pot.

By the employment of two or more sets of containers each of which is supplied with a different material, either from a separate melting pot or directly, and the outlets of which are connected through pipes provided with valves to a spraying nozzle or nozzles common to them all, so that the materials from either container may be directly sprayed on the descending cereals in the mixing chamber, or a commingling of the materials in desired proportions may be effected and sprayed by first passing the different materials from the respective containers to a common container in which they become intimately mixed before proceeding to the nozzle.

In order to enable flavourings or other materials which it is desired to add to and intimately mix with cereals in a powdered form a feeder is arranged to deliver such powder to the mixer casing at a point below the spraying nozzle and to fall on the descending cereals as they pass to the mixer.

On its issue from the mixer the coated material is by a conveyor carried to a dryer or cooler through which it passes and is delivered to a sifter below by which it receives the final grading.

A compressor is provided for the supply of compressed air to the containers for exerting the pressure on the material contained therein to convey it to the spraying nozzles, and also to such nozzles for producing the necessary injector and spraying action.

The apparatus for the preliminary treatment of the cereals may be steam-jacketed and for some materials a gelatinizer is provided. The gelatinizer may be steam jacketed or otherwise heated and steam is also supplied to the interior of the gelatinizer.

The mixer and containers with their connections to the spraying nozzles and the dryer are steam jacketed and also connected with a water supply to enable the temperature to be regulated as required.

The accompanying drawings illustrate a complete plant for carrying out the continuous operation including the preliminary treatment of the material in a gelatinizer prior to its passage to the spraying apparatus from whence it is conveyed to a dryer and then to a sifter or grader which delivers it into suitable receptacles.

Fig. 1 is an end elevation of such complete plant.

Fig. 2 a longitudinal elevation, and

Fig. 3 a plan view thereof.

Fig. 4 is a longitudinal section drawn to a larger scale of the spraying nozzle.

Fig. 5 is a combined vertical section of the container for the spraying material and the insulation tube therefrom.

Fig. 6 is an end elevation of Fig. 5, and

Fig. 7 is a plan view thereof.

Fig. 8 is a sectional plan of the insulation tube between the containers and the spraying nozzle.

Fig. 9 is a vertical section of the melting pot supplying the spraying material to the containers.

Fig. 10 is a plan view thereof, and

Fig. 11 a side elevation of one of the melting pot agitator plates.

Fig. 12 is a vertical section through the sifter and mixer with intermediate spraying chamber and showing the powder feed attachment thereto.

Fig. 13 is an end elevation of an arrangement of two sets of containers with their melting pots to be embodied in the plant for enabling the spraying to be effected with two different materials.

Fig. 14 is a side elevation of Fig. 13, and

Fig. 15 a plan view thereof.

Fig. 16 is a longitudinal section through the dryer and sifter or grader to which the material passes from the sprayer, and Fig. 17 is a transverse section thereof.

In the above figures the piping is omitted but is shown in Figs. 18, 19 and 20 which correspond with Figs. 1, 2 and 3.

In the complete installation illustrated in Figs. 1, 2 and 3 the cereal or other food material is delivered to the hopper 1 of a sifter 2 of any suitable construction, and nozzles 3 of a liquid spraying apparatus are situated so as to deliver in a spray form the material with which it is desired to coat such cereal as it falls in a finely divided condition from such sifter to a mixer 4 arranged beneath it.

The cereal may be delivered either directly to hopper 1 or may be submitted to a preliminary treatment which will bring the particles thereof to the required condition to ensure ready adhesion of the coating material thereto as same is injected thereon in a film or spray from the nozzles 3. In the drawings a gelatinizer 5 is shown to the hopper 6 of which the cereal is supplied and by a screw 7 is conveyed through the steam jacketed cylinder 8 thereof, and in its passage is subjected to the action of steam issuing from steam jets 9 towards the outer end, and by the conveyor 7 is then delivered at the inner end into the hopper 1 of sifter 2, and as above described is then sprayed by the nozzles 3 as it passes on to the mixer 4 beneath.

An apparatus 47 for the delivery of flavourings or other materials in a powdered form is arranged to deliver same in the required proportions to the casing between the sifter 2 and mixer 4 preferably at a point below that at which the material is submitted to the action of the spraying nozzles 3, and passes with the sprayed material into the mixer by which it becomes intimately mingled with and disseminated throughout the mass thereof.

From the delivery end of the mixer 4 the sprayed material is by an elevator 10 raised to a dryer 11 and finally passes to a sifter or grader 12 beneath and is delivered into casks, barrels or sacks 13 suitably arranged to receive same.

The above is a general description of the operation as carried out by the plant, the apparatus for effecting the different operations of which may be of any known or approved construction for effecting the different requirements, but in order to ensure that the material which is to be sprayed on to the cereals is maintained at the required temperature necessary to ensure its issue from the nozzles 3 in the required fine spray form the special arrangement shown in detail in Figs. 4 to 11 is employed.

The coating material is introduced into a melting pot 14, (see Figs. 9, 10 and 11) provided with winged agitators 15 which are suitably rotated to ensure uniformity of mixture, the pot being water jacketed and maintained at the required degree of temperature by the admission of steam through a circular steam coil 16 situated in the bottom thereof.

The liquid material prepared in the melting pot 14 is by a pipe 17, under the control of valves 18 alternately supplied to one of two containers 19, the container to be brought into operation being closed and placed under pressure by the admission through a valve 20 of compressed air from a compressor 21, which acting on the surface of the liquid forces same through a valve 22 (see Figs. 5 and 6) at the bottom of the container and controlled by hand wheel 23, to regulate the flow to suit the supply of material required to be sprayed.

The liquid material passing through the valve 22 is forced through a tube 24 surrounded by insulating tubes 25, leading to the nozzles 3 but before it can issue therefrom into the spraying chamber 26 (Figs. 1 and 12) between the sifter 2 and the mixer 4 it is atomized or reduced to a vaporous condition by the admission of compressed air to the nozzles 3 at the point 27. The supply of air is controlled by a valve situated in the main air supply pipe leading from the compressor 21, the sprayed liquid is disseminated throughout the material passing in a divided condition through the mixing chamber and effectually coats the particles thereof with a uniform covering of liquid.

While the one container 19 is supplying the material to be sprayed to the nozzles 3, the other is receiving material from the melting pot 14, and when required by the operation of the valves the action may be reversed so that a continuous spraying operation is ensured.

The spraying section of the installation is especially designed to suit the varying consistencies of different liquids to be sprayed, and for this purpose the containers 19 and the internal transporting tubes 24 are provided with hot water jackets 28, so that the flow of the spraying liquids can be maintained at an uniform temperature right up to the point of the sprayers 3. The water jacket of the insulating tubes 25 is heated by a steam coil 29, and the circulation of the hot water automatically maintained in the container jackets through the passages 30, a control valve 31 being provided for adjusting the steam pressure in the coil 29 to control the temperature as required.

The containers 19 are provided with stirrers 32 to maintain a constant circulation, and a strainer 33 is fitted to the outlet to prevent any sediment passing to the sprayers 3.

The containers 19 may be further fitted with an opening at 34 to enable spraying material not requiring preliminary heating in the melting pot 14 to be supplied directly to such containers, such opening then being securely closed before being put into communication through the valve 20 with the air compresser 21.

A single stage direct acting compressor may be employed, and the air before entering the compression cylinder may be purified by filtration through very fine mesh plated wire.

The compressor serves to generate the necessary energy to convey the liquid between the containers 19 and the spraying nozzles 3 as well as to atomize or reduce the liquid to the spray form at the point of issue therefrom, the compressed air being transmitted from such compressor by pipes fitted with control valves conveniently situated for effecting the necessary adjustment as required.

To permit of the spraying of cereals with a combined spray of two or more different substances the arrangement of containers with melting pots hereinbefore described may be duplicated, a plurality of same being employed in connection with a spraying nozzle common to them all, such an arrangement of two sets being illustrated in Figs. 13, 14 and 15 of the drawings.

In these figures the materials to be sprayed may through a system of supply pipes 33 provided with control valves 34 connecting them with the containers 19, be directed alternately to either of the two pairs of containers 19, and from the latter of which the spraying material may pass either directly to issue together from the nozzles 3, or, by adjusting the control valves 34 may be diverted to one of the commingling containers $19^a$ to permit of the blending of the materials from the upper containers 19 before, by the by-pass 35, passing to said spraying nozzles.

In order to provide for the varying developments or requirements of which the process is capable of adaptation the installation is provided with a feeder of any desired construction from which flavourings or other material in powdered form can be delivered in minute quantities to the chamber 26 between the sifter 2 and mixer 4 at a point below that at which the material under treatment has received the liquid material from the spraying nozzles 3. The provision of a feeder for this purpose is indicated at 47 in Figs. 1 to 3 and separately in Fig. 12, is of the known form in which powder is kept in agitation by stirrers and fed through a diaphragm or disc and falls directly by gravitation through the spouting 48 into the mixer 4.

On its delivery from the mixer 4 the elevator 10 raises and delivers same to the hopper at one end of the dryer 11, a suitable construction of which is illustrated in Figs. 16 and 17, in which it is submitted to the action of blades 36 arranged helically and rotating in a steam jacketed casing 37 so as to convey same to the opposite end while subjected to heat. The dried material may either pass out directly through an opening 38 in the bottom casing 37 for the purpose of working in batches, but which for continuous working will be closed by the slide 39 when a sufficient head will accumulate to ensure an efficient agitation and mixing and the discharge from the casing 37 then taking place through the top outlet at 40.

The delivery from the dryer 11 is into the casing of the sifter or grader 12 arranged beneath same and the material forced through the sieve 41 of which by the rotating brush 42 falls into the casing of a screw conveyor 43 which delivers it centrally into receptacles 13 arranged to receive same, while any lumps or tailings not passing through the sieve 41 are discharged at the end 45 thereof.

The installation provides all the necessary apparatus for treating and amalgamating special food products, as selected from granular cereals, flour, edible fats, flavourings, essences, powders, fruits, sugar, colouring matters, etc., and a supply of interchangeable nozzles will be provided to meet varying conditions of the liquids to be sprayed.

An overhead water supply tank 46 is suitably arranged and distributing piping fitted with the necessary control valves will be provided for the steam and cold water supply.

Steam is supplied through a pipe 48 controlled by a valve 49. The pipe 48 has a branch 50 leading to the jacket and steam jets 9 of the gelatinizer 5. Another branch 51 leads to the steam coil 16 in the melting pot 14. Another branch 52 leads to the nozzles 3. Another branch 53 leads to the jacket of the mixer 4. Another branch 54 leads to the jacket of the dryer 11. Cold water from the tank 46 passes along a pipe 55 to the mixer 4 and another branch 56 leads to the containers 19 and another branch 57 leads to the melting pot 14 for washing out purposes and another branch 58 leads to the dryer 11. Steam and water drain pipes 59 leading to the main drain pipe 60 are provided. Compressed air from the compressor 21 passes by a pipe 61 to the containers 19 and spray nozzles 3.

What we claim as our invention, and desire to secure by Letters Patent, is:—

1. In an apparatus for coating food materials with liquid substances, the combination of mechanism for treating the material to ensure the adhesion of the coating substance, a sifter to receive said materials, means for spraying the liquid onto the material in its passage from said sifter, a mixer to receive the sprayed material located below the spraying means, a dryer connected with the mixer to receive the material therefrom, and a grader connected to receive the material from the dryer.

2. In an apparatus for coating food materials with liquid substances, the combination of mechanism for treating the material to ensure the adhesion of the coating substance, a sifter to receive said material, means for spraying the liquid onto the material in its passage from said sifter, a mixer to receive the sprayed material located below the spraying means, means for supplying flavoring material to said mixer, a dryer connected to receive the material from the mixer, and a grader connected with the dryer.

3. In an apparatus for coating food materials with liquid substances, the combination of mechanism for treating the material to ensure the adhesion of the coating substance, a sifter to receive said material, means for spraying the coating liquid onto the material in its passage from the sifter, a mixer to receive the sprayed material, a dryer connected with the mixer, means for conveying the material from the mixer to the dryer, a grader connected to receive the material from the dryer, and a conveyor to deliver the material from the grader to a suitable place of deposit.

4. In an apparatus for coating food materials with liquid substances, the combination of a gelatinizer for treating the material to ensure the adhesion of the coating substance, a sifter to receive the gelatinized material, a mixer to receive the material from the sifter, spraying nozzles discharging into the path traversed by the material in its passage from the sifter to the mixer, a dryer, a conveyor for conducting the material from the mixer to the dryer, and a grader connected to receive the material from the dryer.

5. In an apparatus for coating food materials with liquid substances, a gelatinizer for treating the material to be coated to ensure the adhesion of the coating substance, a sifter to receive the gelatinized material, a mixer to receive the material from the sifter, spraying nozzles discharging into the path traversed by the material in its passage from the sifter to the mixer, a drier, a conveyor for conducting the material from the mixer to the dryer, heating means in the form of a valve controlled pipe, for supplying steam to the apparatus, said pipe having branches leading respectively to the gelatinizer, the spraying nozzles, the mixer and the dryer.

6. In an apparatus for coating food materials with heated liquid substances, a sifter to receive the food materials, a mixer located below the sifter and spaced therefrom, a melting pot to receive the coating substances to be heated, means for heating the melting pot, a container connected to receive the material from the melting pot, heating means for the container, a spraying nozzle connected with the container and discharging into the path of the material in its passage from the sifter to the mixer, means for heating the spraying nozzle, and connections for compressed air for the container and the nozzle.

7. In an apparatus for coating food materials with liquid substances, the combination of a sifter to receive the food materials, a mixer located below the sifter, a spraying chamber intermediate the chamber and the mixer, a spraying device for spraying the liquid onto the material in its passage from said sifter through the spraying chamber to the mixer, means for heating the spraying device, a drier connected with the mixer to receive the material therefrom, and a grader connected to the drier to receive the material from the latter.

8. In an apparatus for coating food materials with liquid substances, the combination of a sifter to receive the food materials, a mixer located below the sifter, a spraying chamber intermediate the sifter and the mixer, a spraying device for spraying the liquid onto the material in its passage from the said sifter through the spraying chamber to the mixer, means for heating the spraying device, means for supplying flavoring material to said mixer, a drier connected with the mixer to receive the material therefrom, and a grader connected with the drier.

9. In an apparatus for coating food materials with liquid substances, the combination of a sifter to receive the food materials, a mixer located below the sifter, a spraying chamber intermediate the sifter and the mixer, a spraying device for spraying the liquid onto the material in its passage from the said sifter through the spraying chamber to the mixer, means for heating the spraying device, a drier connected with the mixer to receive the material therefrom, means for conveying the material from the mixer to the drier, a grader connected to the drier to receive the material therefrom, and a conveyor to deliver the material from the grader to a suitable place of deposit.

10. In an apparatus for coating food materials with liquid substances, the combination of a sifter to receive the food materials, a mixer located below the sifter, a spraying chamber intermediate the sifter and the mixer, a spraying device for spraying the liquid onto the material in its passage from the said sifter through the spraying chamber to the mixer, means for heating the spraying device, means for supplying flavoring material to the mixer, a drier connected with the mixer to receive the material therefrom, means for conveying the material from the mixer to the drier, a grader connected to the drier for receiving the material therefrom, and a conveyor to deliver the material from the grader to a suitable place of deposit.

11. In an apparatus for coating food materials with liquid substances, the combination of a sifter to receive the food material, a mixer located below the sifter, a spraying chamber intermediate the mixer and the sifter, a spraying nozzle for discharging the liquid into the path traversed by the material in its passage from the sifter to the mixer, a drier, a conveyor for conducting the material from the mixer to the drier, heating means in the form of a valve-controlled pipe for supplying steam to the apparatus, said pipe having branches leading respectively to the gelatinizer, the spraying nozzles, the mixer and the drier.

12. In an apparatus for coating food materials with substances which are heated to render them liquid including a gelatinizer, means for heating the gelatinizer both internally and externally, a conveyor in the gelatinizer, a sifter connected to the gelatinizer, a mixing apparatus connected with the sifter, means for heating the coating substances to render them liquid, a spray nozzle connected with said last mentioned means, and connections for compressed air for the nozzle.

13. In an apparatus for coating food material with liquid substances, the combination of a gelatinizer for treating the material to ensure the adhesion of the coating substance and comprising a hopper to receive the material to be treated, a steam jacketed cylinder leading from said hopper, steam jets discharging into said cylinder, and a conveyor-screw located in said cylinder, a sifter to receive the food materials, a mixer located below the sifter, a melting pot to receive the coating substance to be heated, means for heating the melting pot, a container connected to receive the material from the melting pot, heating means for the container, a spraying nozzle connected with the container and discharging into the path of the material in its passage from the sifter to the mixer, means for heating the spraying nozzle, and connections for compressed air for the container and the nozzle.

14. An apparatus of the class described including a melting pot for the coating material comprising a vessel having spaced double walls with a steam coil located between said walls at the bottom of the vessel, means for controlling the pressure in the coil, agitators in said vessel, duplicate receiving vessels means for alternately placing said duplicate vessels in communication with said first mentioned vessel, spraying nozzles connected with said receiving vessels for discharge of the coating material, means connecting said receiving vessels together and to the first mentioned vessel to provide for the alternate filling of said receiving vessels and delivery to the spraying nozzle.

15. An apparatus of the class described including a melting pot to receive the substances to be heated and used as a coating, means for heating the melting pot, a container connected with the melting pot, means for heating the container, a spraying nozzle, a tube leading from the container to the spraying nozzle, another tube and a heating coil surrounding the first mentioned tube, means for heating the coil, and connections for compressed air for the container and the nozzle.

16. An apparatus of the class described including a jacketed melting pot, a heating coil in the jacket of the pot, agitators in the melting pot, means for operating the agitators, a container connected with the melting pot, means for heating the container, a spraying nozzle, a tube leading from the container to the spraying nozzle, another tube and a coil surrounding the first mentioned tube, means for heating the coil, and connections for compressed air for the container and the nozzle.

In testimony whereof we have signed our names to this specification.

CHARLES EDWARD GARDNER.
ARTHUR ROWLAND GOODWIN.